United States Patent [19]
DeMichael et al.

[11] Patent Number: 5,560,841
[45] Date of Patent: Oct. 1, 1996

[54] STATOR VANE EXTRACTION

[75] Inventors: Thomas DeMichael, Stuart; David N. Cunningham; Philip G. Seeley, both of Jupiter, all of Fla.

[73] Assignee: United Technologies Corporation, Hartford, Conn.

[21] Appl. No.: 321,348

[22] Filed: Oct. 11, 1994

[51] Int. Cl.⁶ .................................................. B23K 11/22
[52] U.S. Cl. .................. 219/85.1; 219/85.14; 219/85.15; 219/85.19; 228/119; 228/191; 228/264
[58] Field of Search ............................... 219/85.1, 85.14, 219/85.15, 85.16, 85.19, 85.22, 68, 234, 209, 210; 29/889.1; 228/119, 191, 264

[56] References Cited

U.S. PATENT DOCUMENTS

| | | | |
|---|---|---|---|
| 3,414,960 | 12/1968 | Michael | 29/762 |
| 3,592,993 | 7/1971 | Bennett | 219/85.15 |
| 3,710,432 | 1/1973 | Dieffenbacher et al. | 29/762 |
| 4,532,681 | 8/1985 | Baker et al. | 403/28 |
| 4,769,525 | 9/1988 | Leatham | 219/209 |
| 4,873,751 | 10/1989 | Walker et al. | 29/156.5 |
| 4,882,975 | 4/1986 | Daughton | 219/209 |

FOREIGN PATENT DOCUMENTS

| | | | |
|---|---|---|---|
| 53-109839 | 9/1978 | Japan | 219/85.14 |
| 54-162465 | 12/1979 | Japan | 228/119 |

Primary Examiner—Teresa J. Walberg
Assistant Examiner—J. Pelham
Attorney, Agent, or Firm—Christopher T. Hayes

[57] ABSTRACT

A method in which the interface at which two components are bonded together, by a bonding material that has a lower melting temperature than the material from which the components are made, is heated to the melting temperature of the bonding material, allowing the components to be separated without cutting any of the interface material.

19 Claims, 10 Drawing Sheets

STATOR VANE EXTRACTION

DESCRIPTION

1. Field of the Invention

This invention relates to a method and apparatus for detaching parts that have been bonded together by a bonding material that has a lower melting temperature than the parts, and more specifically to detaching stator vanes from the stator ring to which parts have been brazed together.

2. Background of the Invention

Axial flow gas turbine engines of the type that power many of the military and commercial aircraft incorporate compressor blades and turbine blades. The compressor blades are used to compress air, the "working fluid", which is fed into a combustion chamber, mixed with fuel to form combustion products, and the turbine blades are used to extract work from the combustion products. The efficiency with which the compressor or turbine blades compress, or extract work from, respectively, the working fluid depends in part on the angle of attack at which the working fluid and the airfoil section of each blade meet. This angle is frequently controlled by vanes positioned immediately upstream of the blades to turn the oncoming working fluid so that the blades and the working fluid meet at the desired angle of attack.

Figure 1:
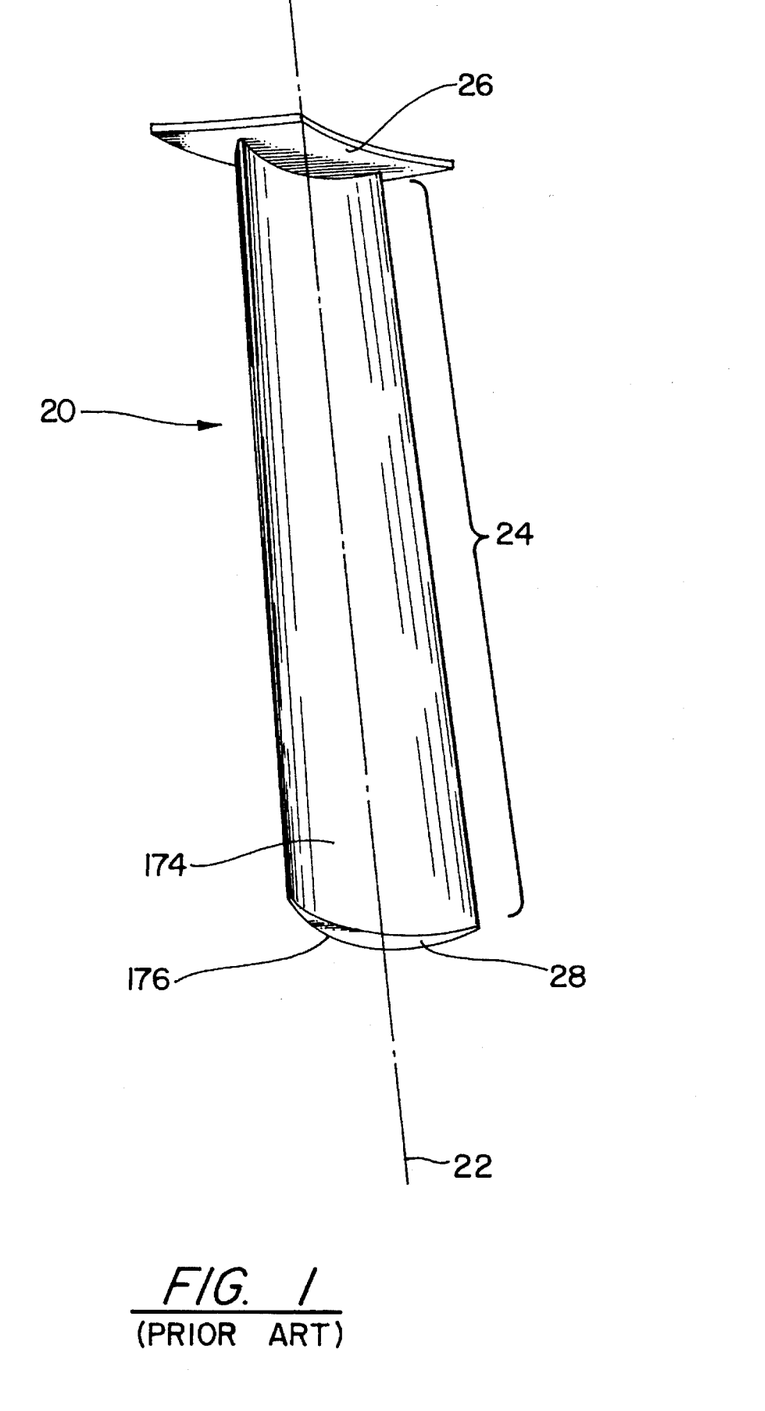
FIG. 1 is a plan view of a single stator vane of the type used in gas turbine engines.
Figure 2:
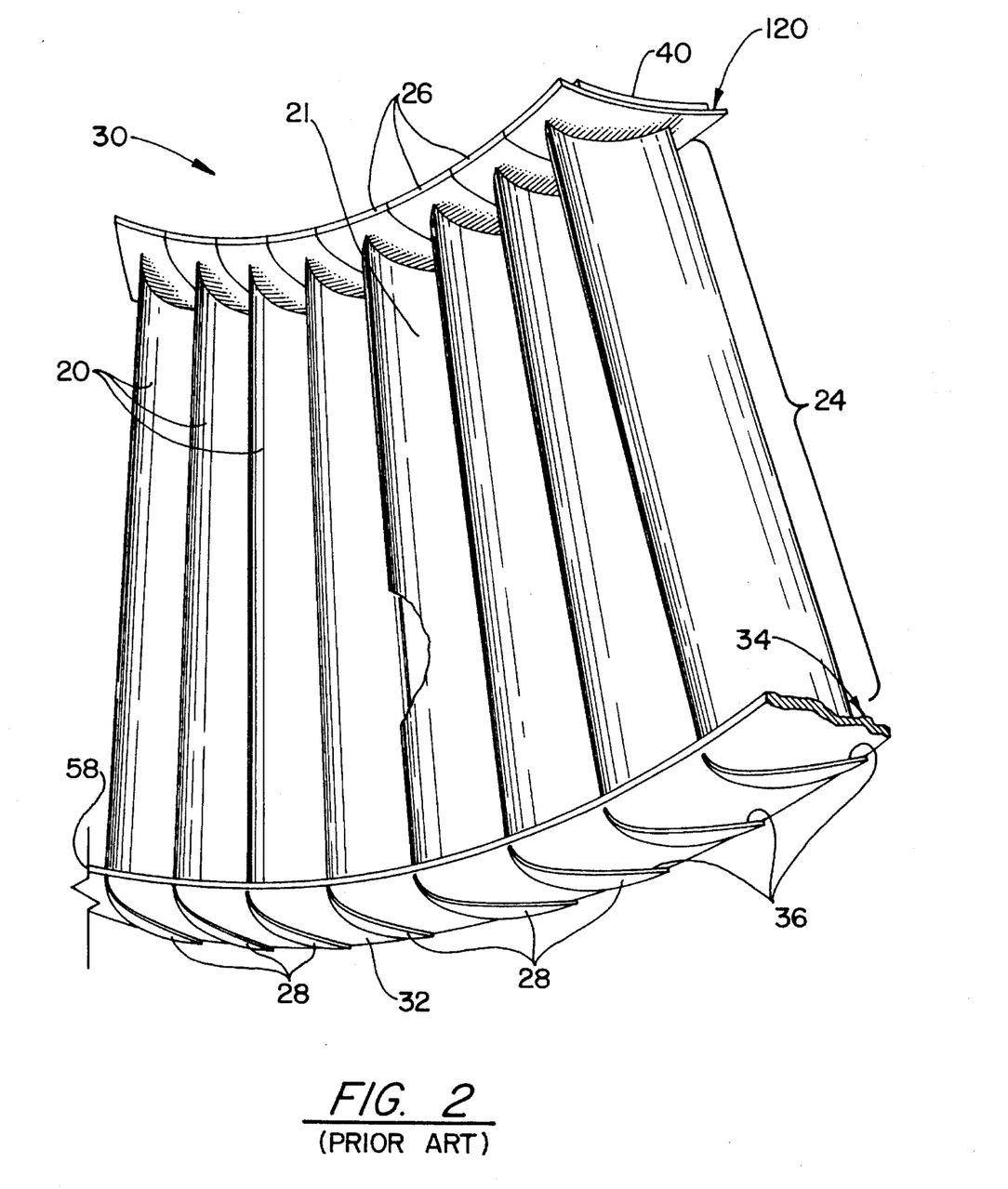
FIG. 2 is a partially sectioned view of a stator vane assembly having a single damaged stator vane.

Vanes that are fixed, in that they do not rotate about the shaft of the engine as do the compressor and turbine blades, are termed "stator vanes". Each stator vane 20 has a longitudinal axis 22 and an airfoil portion 24 that extends along that axis 22 from a vane platform 26 and terminates in a vane tip 28, as shown in FIG. 1. The stator vanes 20 are typically manufactured into a stator assembly 30, a portion of which is shown in FIG. 2, that includes an outer stator ring 32 into which the vane tips 28 are brazed at an interface therebetween, and the stator vanes 20 are equally spaced circumferentially about the inner surface 34 of the stator ring 32. For production purposes, two rows of stator vanes may be secured to a single outer stator ring as disclosed below.

Each stator ring 32 is typically split into two semi-circular sections so that a stator assembly 30 can be replaced without disassembling the engine to the extent that would be required if the stator ring 32 were a single, continuous hoop. The vane tip 28 of each stator vane is received within the outer stator ring 32, and the airfoil portion 24 thereof extends radially inward of the outer stator ring 32. The outer stator ring 32 has a plurality of openings 36 equal in quantity to the quantity of vanes 20, and each opening 36 conforms to the shape of the airfoil portion 24 at the vane tip 28, but is slightly larger than the airfoil portion 24. The slightly larger opening 36 is necessary so that the vane tip 28 and opening 36 can be coated with braze material and still allow the vane tip 28 to fit through the coated opening 36 and be brazed to the outer stator ring 32.

The vane platforms 26 are located at the radially innermost portion of each stator vane 20 relative to the outer stator ring 32. Each vane platform 26 is curved and abuts the platforms 26 of immediately adjacent stator vanes 20 such that the vane platforms 26 together form a ring of stator platforms 26. When all of the stator vanes 20 are positioned in the outer stator ring 32, the platforms collectively form an inner stator ring radially inward of the airfoils 24. Referring to FIG. 2, a strip 40 of metal may be attached to span several adjacent platforms 26 by tack welding the strip 40 thereto to restrict shifting of the platforms 26 relative to each other.

In the normal course of operation, a stator vane 21 may be damaged by birds, rocks, and runway debris ingested by the engine. To repair a damaged stator vane 21, the stator assembly 30 is removed from the engine, and a hole is cut through the outer ring 32 about the periphery at the tip 28 of the damaged stator vane 21, thus removing the braze material that form the interface therebetween. This hole may be cut by using one of the many hole-cutting methods known in the art, including use of Electro-Discharge Machining ("EDM"). The amount of material that must be removed from the outer ring 32 in cutting the hole is significant, resulting in a hole which is substantially larger than the original vane tip opening 36 in which the damaged stator vane 21 was originally secured. Once the damaged stator vane has been cut free from the outer ring 32, the damaged stator vane 21 is freed by grinding away the spot welds that secure the strip 40 to the platforms 26, thereby freeing the damaged stator vane 21 from the stator assembly 30. The damaged stator vane 21 is then removed, and grinding of the surfaces of the outer ring 32 adjacent the hole is done as necessary to remove any rough spots resulting from the cutting process. A new stator vane 20 is positioned into the stator assembly 30 with the new stator vane's tip 28 protruding through the hole in the outer stator ring 32, and the platform of the new stator vane 20 is attached to adjacent vane platforms 26 by spot welding the strip 40 to the platform of the new stator vane 20. The new stator vane 20 is then secured with the vane tip 28 positioned as desired within the hole, and the outer ring 32 is then welded to the tip 28 of the stator vane 20 about the periphery thereof. Alternately, the tip 28 of the new stator vane may be brazed to the outer ring 32 if the gap between the tip 28 of the new stator vane 20 and the edge of the hole in the outer ring 32 is small enough that braze material will wick into and fill the gap around the entire periphery of the new stator vane tip 28. The vane assembly 30 is then ready to be placed back into the engine.

Although the known method of repairing damaged stator vanes is effective, the hole cutting process is time consuming and labor intensive, since the EDM process is relatively slow and requires a skilled technician to ensure that the hole is cut properly. Additionally, the labor required to grind the outer stator ring after the hole is cut, and the labor required to secure and weld the new vane in position, add to the cost of the repair procedure of the prior art.

What is needed is a method of removing damaged stator vanes from a stator assembly which reduces the time and labor costs of the method of the prior art.

SUMMARY OF THE INVENTION

It is therefore an object of the present invention is to provide a method for removing damaged stator vanes from stator assemblies of gas turbine engines which requires less time and labor than the method of the prior art.

Another object of the present invention is to provide a device for removing damaged stator vanes from stator assemblies of gas turbine engines which requires less time and labor than the method of the prior art.

According to the present invention a method is disclosed in which two components, such as a stator vane and an outer stator ring, are bonded together at an interface by a bonding material, such as braze material, that has a lower melting temperature than the material from which the components are made. The interface is heated to the melting temperature of the bonding material, allowing the components to be separated without cutting any of the interface material. A device for practicing the method of the present invention is also disclosed.

The foregoing and other features and advantages of the present invention will become more apparent from the following description and accompanying drawings.

DESCRIPTION OF THE PREFERRED EMBODIMENT OF THE PRESENT INVENTION

The preferred method of the present invention is practiced by removing a single damaged stator vane, with the method being repeated as necessary to remove any number of damaged stator vanes as desired. As those skilled in the art will readily appreciate, the method can be used in those situations where the stator vane and outer stator ring are bonded together by a bonding material, the stator vane, stator ring and the bonding material are made of metal, and the stator vane and the stator ring are made of material having a melting temperature greater than the melting temperature of the bonding material.

Figure 3:
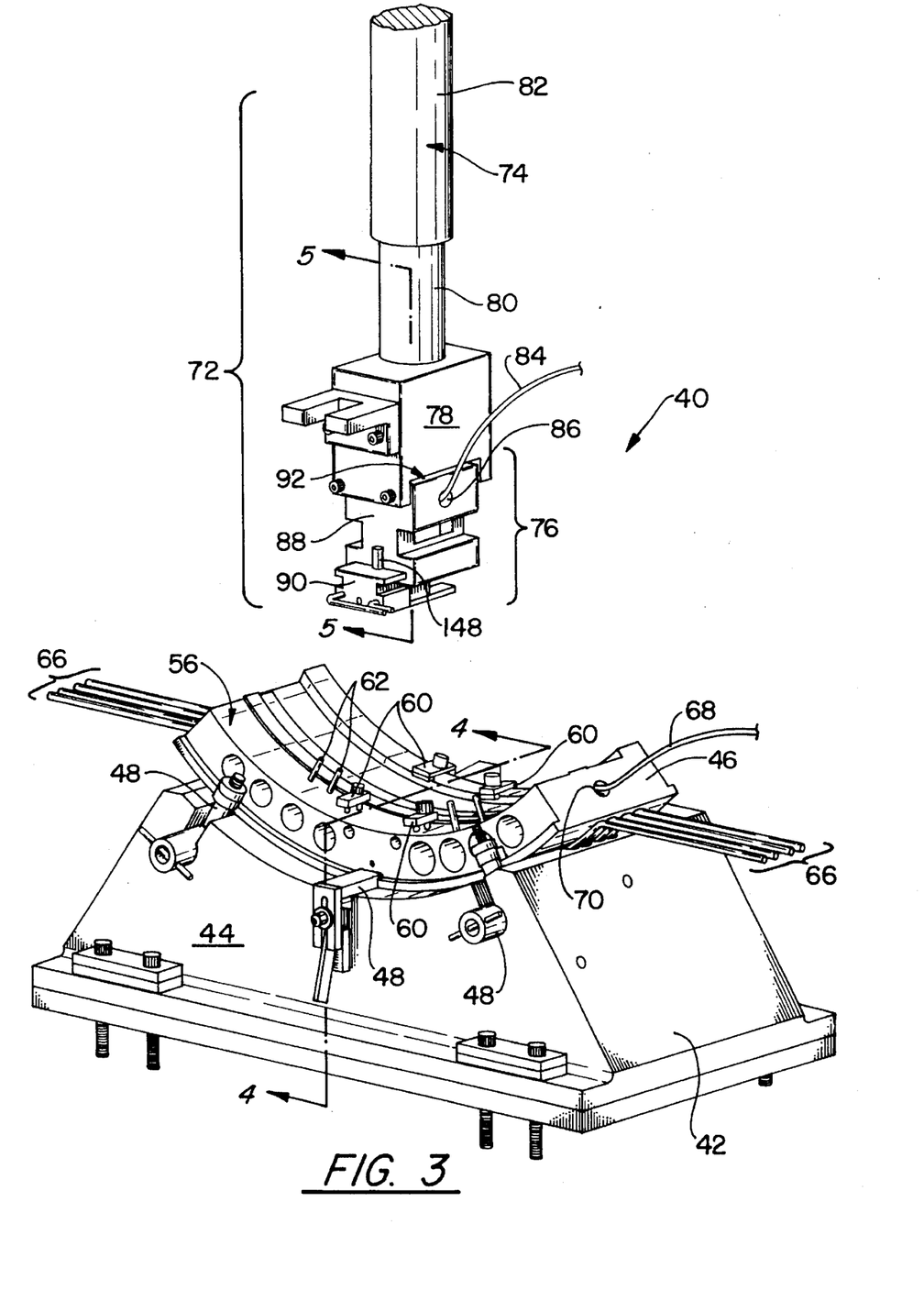
FIG. 3 is a view of the vane extraction device of the present invention.
Figure 4:
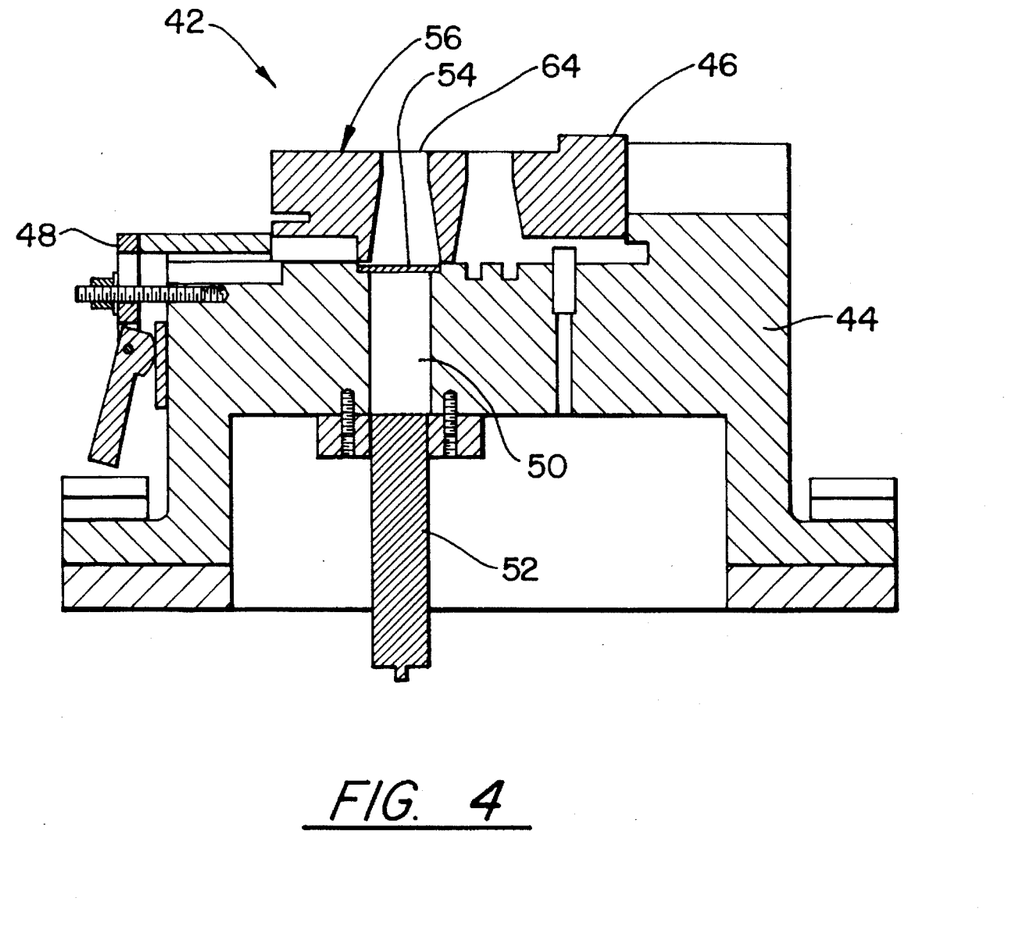
FIG. 4 is a cross-sectional view of the fixture of the present invention taken along line 4—4 of FIG. 3.

The apparatus 40 of the present invention is shown in FIGS. 3-11 and includes a fixture 42 to hold the stator section 30 securely. The fixture includes a base 44, and a removable stator cradle 46 that is fixed to the base by a first set of clamps 48 that secure the cradle 46 to the base 44 while allowing for thermal expansion of the cradle 46 relative to the base 44. The stator cradle 46 and base 44 are made of high strength material, such as steel, having high electrical and high thermal conductivity. As shown in FIG. 4, the base 44 includes a passage 50 having an optical pyrometer 52 mounted at one end thereof, and a transparent shield 54 mounted to the other end thereof. The support surface 56 of the cradle 46, opposite the base 44, is preferably machined to generally conform to the radially outer surface 58 of the outer stator ring 32. As those skilled in the art will readily appreciate, the various diameters of outer stator rings within a given engine require that the fixture 44 be adaptable to handle various diameters of stator rings. This invention anticipates that each fixture 44 has several cradles 46, each having a support surface 56 which conforms to the radially outer surface 58 of one of the outer stator rings 32, and which particular cradle 46 is removeably secured to the base 44 is determined by which of the outer stator tings 32 has the damaged stator vane(s) therein.

The cradle 46 has a second set of clamps 60 attached to the support surface 56 to removeably secure the outer stator ring 32 to the support surface 56, and the cradle 46 preferably includes positioning pins 62 to aid in the correct positioning of the outer stator ring 32 on the support surface 56. Near the center of the cradle is an aperture 64 as shown in FIG. 3, the purpose of which is discussed in greater detail below. The fixture 42 includes several cooling tubes 66 which are in thermal contact with the cradle 46 to remove heat therefrom. The cooling tubes 66 are secured in channels in the base 44 adjacent the cradle 46. The cooling passages are in thermal contact with the cradle 46 which, in turn, is in thermal contact with the outer stator ring 32. Coolant, preferably water, is supplied to the cooling tubes by coolant supply lines connected to a first coolant supply (not shown) and removed from the cooling passages by the coolant exhaust tube. The coolant exhaust tube is connected to, and discharges into, a first coolant collector (not shown). At least one power cable 68 is connected to the cradle 46 by an electrically conductive fastener 70, such as a steel bolt, to provide electrical current to the cradle 46.

The present invention also includes vane extractor 72 for pulling the damaged vane from the outer stator ring. The extractor 72 includes an hydraulic ram 74 which is connected to a vane pulling tool 76 by a puller block 78. The hydraulic ram 74 is of the type known in the art, having a shaft 80 extending from an hydraulic cylinder 82. The hydraulic cylinder 82 is, in turn, fixed to a static structure to prevent movement of the cylinder 82 relative to the cradle 46. The hydraulic ram 74 is positioned directly over the aperture 64 so that the shaft 80 is vertical, and when the shaft 80 extends the vane pulling tool 76 moves directly toward the aperture 64.

Figure 5:
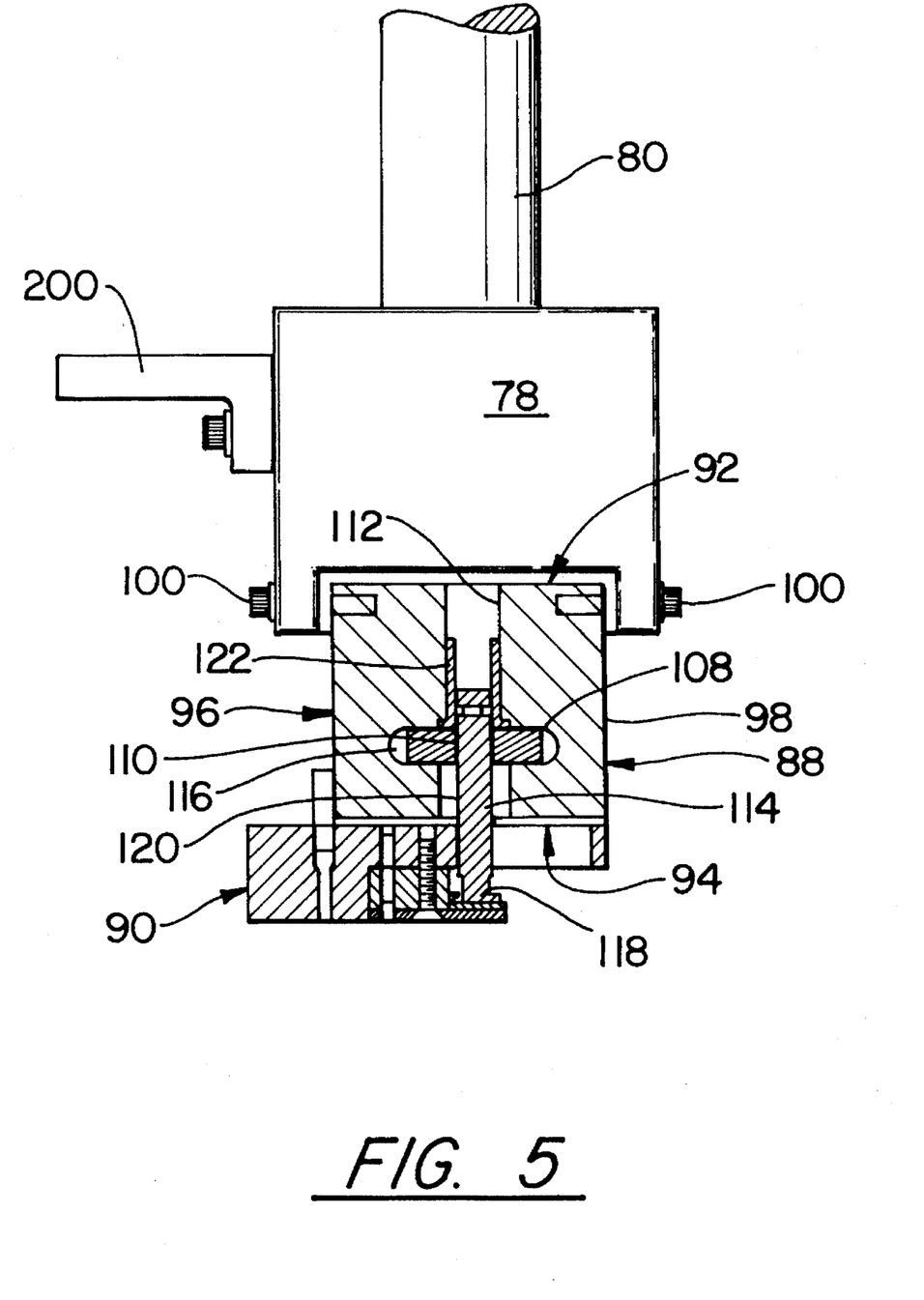
FIG. 5 is a cross-sectional view of the vane extractor of the present invention taken along line 5—5 of FIG. 3.
Figure 6:
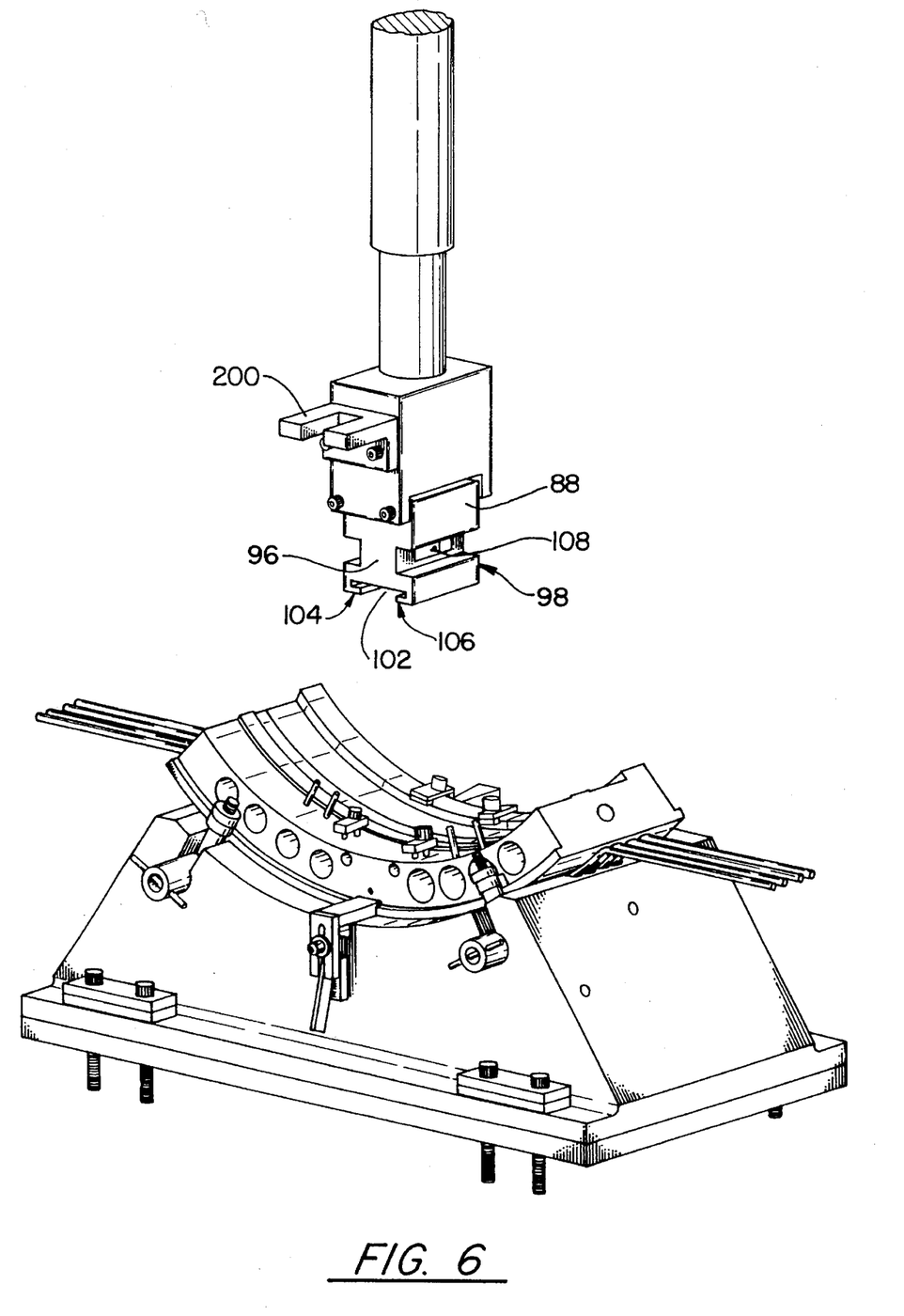
FIG. 6 is the vane extraction device of FIG. 3 showing the vane platform attachment removed.

As shown in FIG. 5, the vane pulling tool 76 includes a bracket 88 and a vane platform attachment 90. The bracket 88 and vane platform attachment 90 are made of an electrically conductive material, such as steel. The bracket 88 has an upper face 92, a lower face 94 opposite the upper face 92, a front face 96, and a rear face 98 opposite the front face 96. The bracket 88 is attached to the puller block 78 so that the upper face 92 faces the shaft 80 of the hydraulic ram. The bracket 88 is attached to the puller block 78 by metal bolts 100 so that electricity can flow from the puller block 78 to the bracket 88, or vice-versa, with little or no resistance. As shown in FIG. 6, the lower face 94 of the bracket 88 includes a "C" shaped channel 102 that extends from the front face 96 to the rear face 98. The channel 102 has two lands 104, 106 opposite each other, the purpose of which is discussed in greater detail below. At least one power cable 84 is connected to the bracket 88 by an electrically conductive fastener 86, such as a steel bolt, to provide electrical current to the bracket 88.

Referring to FIGS. 5 and 6, the bracket 88 also includes a clamping wheel 108 having a threaded bore 110 extending therethrough, and an internal bore 112 in which a threaded shaft 114 is located. The clamping wheel 108 and the threaded shaft 114 are made of an electrically conductive material, such as steel. The wheel 108 is rotatably received within a cavity 116 in the bracket 88 through which the internal bore 112 extends. The width of the cavity 116, that being the greatest dimension of the cavity 116 parallel to the internal bore 112, is only slightly greater than the thickness of the wheel 108. Thus, when the wheel 108 is located in the cavity 116 coaxial with the internal bore 112, the walls of the cavity 116 prevent any significant movement of the wheel 108 axial of the internal bore 112.

The end 118 of the threaded shaft 114 distant from the puller block 78 generally conforms to the radially inner surface 120 of the platform 26 of the damaged stator vane 21 to provide effective thermal and electrical contact therebetween. A portion of the threaded shaft 114 is received within, and meshes with, the threaded bore 110 of the wheel 108, and the diameter of the threaded bore 110 is slightly greater than the diameter of the threaded shaft 114, so that the threaded bore 110 rotates about the threaded shaft 114. The threaded shaft 114 has at least one slot 120 extending longitudinally through the threads thereof, and the width of the slot is large enough to slidably receive therein a key 122 that protrudes from the internal bore 112 and is fixedly mounted thereto. As those skilled in the art will readily appreciate, the key 122 and slot 120 prevent the threaded shaft 114 from rotating within the internal bore 112, thus restricting the threaded shaft 114 to axial movement therein. Likewise, the walls of the cavity 116 prevent axial movement of the wheel 108, restricting the wheel 108 to rotational movement. Therefore, when the wheel 108 is rotated, the threaded shaft 114 is forced to move axially in the internal bore 112.

Figure 7:
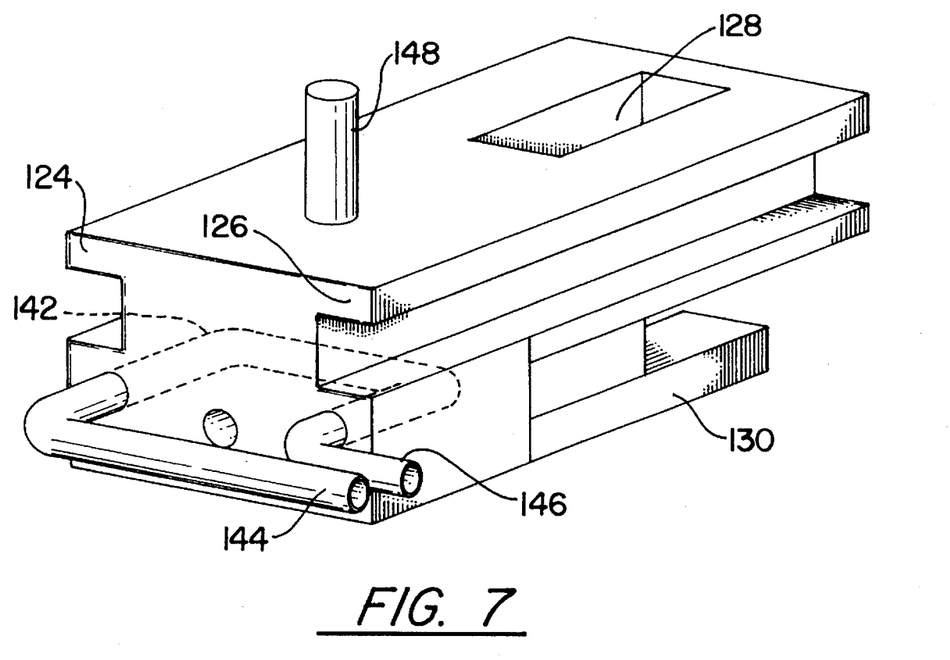
FIG. 7 is a perspective view of the vane platform attachment of the present invention.
Figure 8:
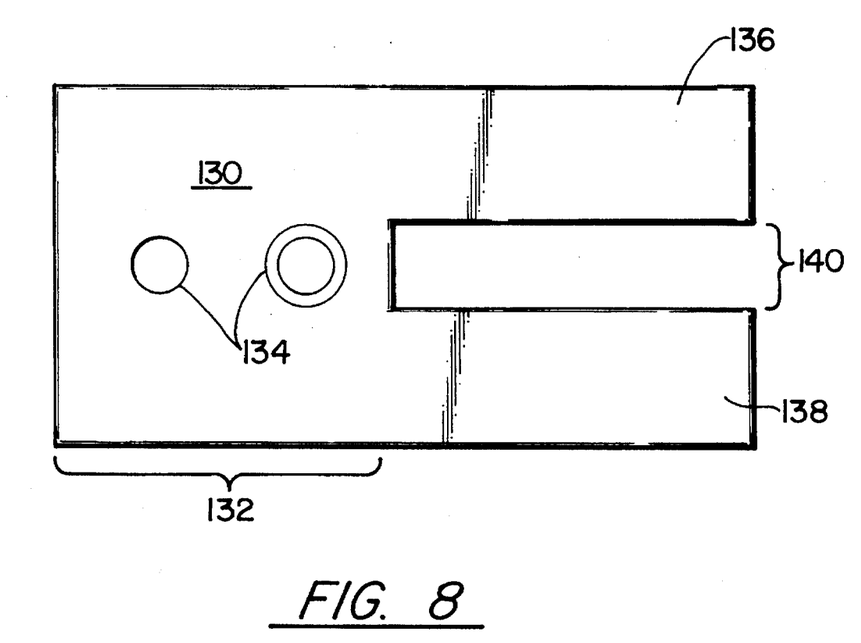
FIG. 8 is a plan view of the fork of the vane platform attachment of the present invention.

As shown in FIG. 7, the vane platform attachment 90 has two longitudinally extending flanges 124, 126, on opposite sides of the vane platform attachment 90, and there is an opening 128 located between the two flanges 124, 126 which extends vertically through the vane platform attachment 90. A fork 130 is removably secured to the vane platform attachment 90 using one or more bolts. As shown in FIG. 8, the fork 130 has a main section 132 having one or more holes 134 for receiving bolts to fasten the fork 130 to the vane platform attachment 90. The fork 130 has two arms 136, 138 in spaced relation to each other defining a gap 140 therebetween. The gap 140 has a width that is wide enough to allow the airfoil portion 24 of a damaged stator vane 21 to pass freely therethrough, but the width of the gap 140 is narrow enough to prevent the platform 26 of a damaged stator vane 21 from passing therethrough. Obviously, since stator vane airfoils 24 vary dramatically from stage to stage of a gas turbine engine, the present invention has several forks of various gap widths, and the particular fork 130 to be used is determined by the dimensions of the airfoil 24 and platform 26 of the damaged stator vane 21 to be removed.

The vane platform attachment 90 has an internal vane platform attachment cooling passage 142 having an inlet 144 and an outlet 146. A vane platform attachment coolant supply tube (not shown) is connected to the inlet 144 of the cooling passage 142 and a vane platform attachment coolant exhaust tube is connected to the outlet 146 of the vane platform attachment cooling passage 142. The vane platform attachment coolant supply tube is connected to a second coolant supply (not shown) that is electrically isolated from the first coolant supply. Coolant is removed from the cooling passage 142 of the vane platform attachment by the vane platform attachment coolant exhaust tube. The vane platform attachment coolant exhaust tube is connected to, and discharges into, a second coolant collector (not shown), that is electrically isolated from the first coolant collector.

Referring back to FIG. 3, the flanges of the vane platform attachment 90 are slidably receivable within the "C" channel 102 of the bracket 88 such that each flange 124, 126 rests on one of the lands 104, 106, and the vane platform attachment 90 is supported solely by the bracket 88. A pin 148 extending from the vane platform attachment 90 provides a stop which prevents the vane platform attachment 90 from sliding entirely through the "C" channel 102.

Figure 9:
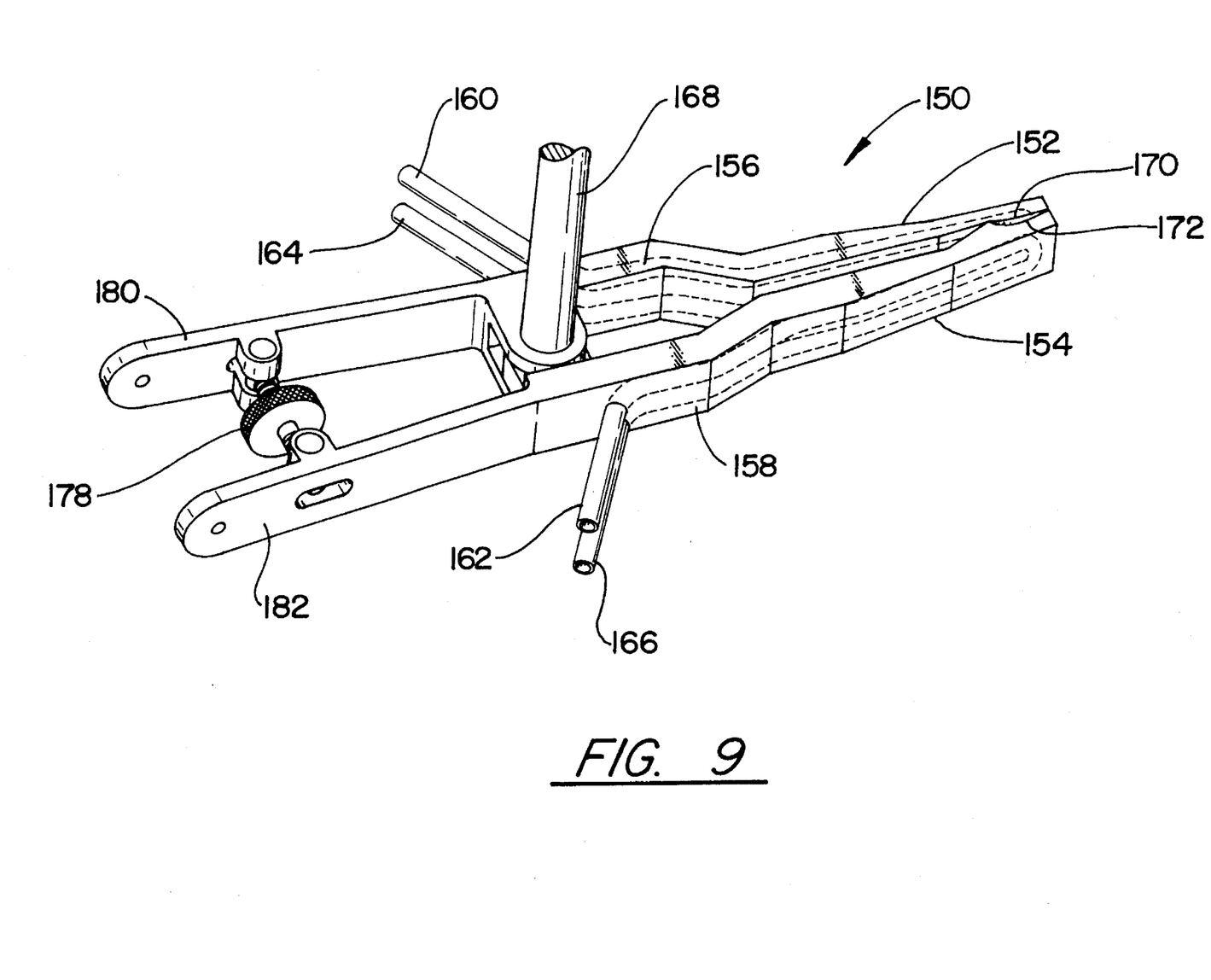
FIG. 9 is a perspective view of the cooled pliers of the present invention.
Figure 10:
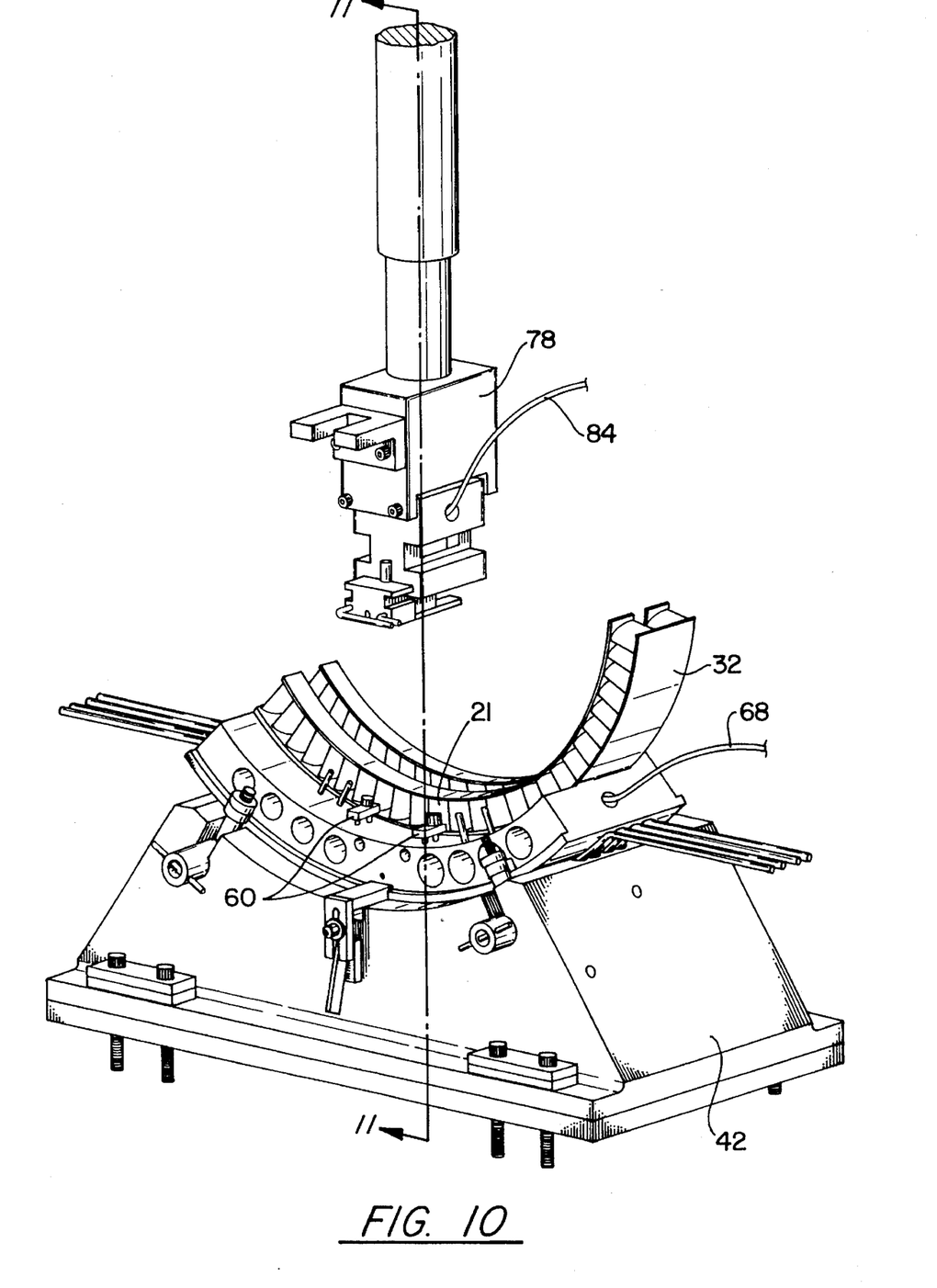
FIG. 10 is the vane extraction device of FIG. 3 showing the outer stator ring secured to the fixture.
Figure 11:
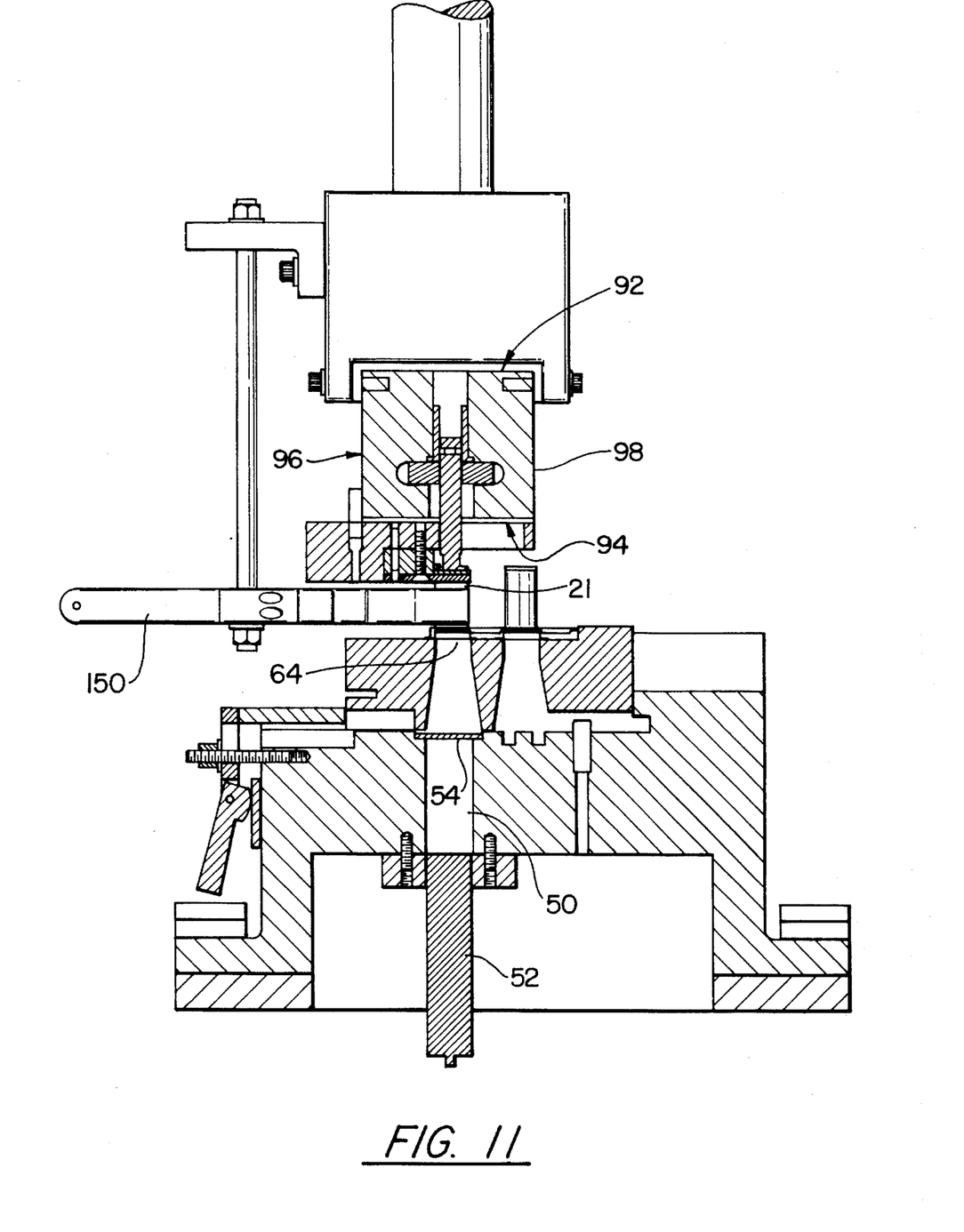
FIG. 11 is a cross-sectional view taken along line 11—11 of FIG. 10 showing the pliers attached to the damaged stator vane.

The apparatus 40 of the present invention includes a pair of cooled pliers 150, as shown in FIG. 9. Each jaw 152, 154 of the pliers 150 preferably includes an internal cooling passage 156, 158 having an inlet 160, 162 and an outlet 164, 166, and coolant from the second coolant supply is fed to each inlet 160, 162 of the pliers 150 using flexible tubing (not shown) during practice of the present invention. Likewise, coolant is exhausted from each outlet 164, 166 of the pliers 150 using flexible tubes (not shown) connected to the second coolant collector. The pivot point of the pliers 150 is preferably located at the centroid thereof, and a support shaft 168 is secured to the pliers 150 at the pivot point so that the pliers 150 are balanced about the pivot point. The support shaft 168 supports the pliers 150 from a plier support bracket 200 that is mounted to the puller block 78, as shown in FIGS. 5 and 11. Adjacent the terminal end of each jaw 152, 154 of the pliers 150 is an airfoil cooling surface 170, 172 to transfer heat from the airfoil 24 of the damaged stator vane 21. The airfoil cooling surface 170 of one of the jaws conforms to the concave surface 174 of the airfoil, while the airfoil cooling surface 172 of the other jaw conforms to the convex surface 176 of the airfoil (see FIG. 1). As those skilled in the art will readily appreciate, by providing airfoil cooling surfaces 170, 172 which conform to the surfaces of the airfoil 24, the surface area through which heat can be transferred to the pliers 150 is substantially greater than would be the case if the jaws 152, 154 did not have cooling surfaces 170, 172 that conform to the airfoil 24. A locking mechanism 178 is mounted to the handles of the pliers 150 to force the handles 180, 182 apart and thereby drive the jaws 152, 154 toward each other. Such locking mechanisms 178 are well known in the art and are therefore not described in detail herein.

The method of the present invention is practiced on a damaged stator vane 21 by freeing the platform 26 thereof from the platforms 26 of adjacent stator vanes 20. In the case where a strip 40 of metal has been secured to several adjacent platforms 26 by tack welds, the tack welds are removed by grinding enough of the weldment away from each of the tack welds to free up the strip 40 of metal, which is then removed. The cradle 46 for the particular outer stator ring 32 is then selected and secured to the base 44 using the base clamps 48, with the aperture 64 located directly above the base passage 50 and directly below the shaft 80 of the hydraulic ram 74.

The stator section 30 is then positioned onto the cradle 46 and with the damaged stator vane 21 located directly above the aperture 64, so that there is a direct line-of-sight between the vane tip 28 of the damaged stator vane 21 and the pyrometer 52 through the transparent shield 54. The outer stator ring 32 is then clamped into position using the cradle clamps 60 to prevent relative movement between the outer stator ring 32 and the cradle 46. Preferably, the stator section 30 is secured in the cradle 46 such that the longitudinal axis 22 of the damaged stator vane 21 is co-linear with the shaft 80 of the hydraulic ram 74.

With the vane platform attachment 90 slidably received within the bracket 88, the shaft 80 of the hydraulic ram 74 is slowly extended to lower the vane platform attachment 90 into close proximity with the damaged stator vane 21. Prior to contact with the damaged stator vane 21 the vane platform attachment 90 is withdrawn from the "C" channel 102 an amount sufficient to permit the fork 130 to clear the platform 26 of the damaged stator vane 21. The hydraulic ram 74 is then lowered until the fork 130 is below the platform 26 of the damaged stator vane 21 and the gap 140 is aligned with the airfoil 24 thereof. At this point, the vane platform attachment 90 is slid back into the bracket 88 until the pin 148 contacts the bracket 88, thereby capturing the platform 26 of the damaged stator vane 21 between the arms 136, 138 of the fork 130. The shaft 80 of the hydraulic ram 74 is then retracted until the arms 136, 138 of the fork 130 contact the platform 26 of the damaged stator vane 21.

The clamping wheel 108 is then rotated to lower the end 118 of the threaded shaft 114 into intimate contact with the radially inner surface 120 of the platform 26 of the damaged stator vane 21, such that the platform 26 is clamped between the end 118 and the fork 130, and cannot move relative thereto. The jaws 152, 154 of the pliers 150 are then clamped about the airfoil portion 24 of the damaged stator vane 21 such that the airfoil cooling surfaces 170, 172, conform to the airfoil portion 24 and the jaws 152, 154 are in spaced relation to the outer stator ring 32. The pliers 150 are then suspended from the plier support bracket 200 by the support shaft 168 as shown in FIG. 11, with the pliers 150 in a substantially horizontal position.

The flexible coolant tubes are connected to the respective inlets and outlets as described above, and the flow of coolant through the cooling passages of the fixture 42, pliers 150 and the vane platform attachment 90 is initiated. Low voltage current of a known polarity is then applied to the power cable 84 that is connected to the bracket 88, while current of the opposite polarity is applied to the power cable 68 connected to the cradle 46 at an amperage sufficient to heat the bonding material to the melting temperature thereof. Since the only electrical path between the cradle 46 and the vane platform attachment 90 is through the interface between the vane tip 28 and outer stator ring 32, electrical current flows between the damaged stator vane 21 and the outer stator ring 32 through the bonding material at the interface therebetween.

The current flowing through the bonding material heats the bonding material due to the resistance provided by the bonding material. Since the vane platform attachment 90, pliers 150 and fixture 42 all have coolant flowing therethrough, these components remain relatively cool, and since the outer stator ring 32 is in thermal contact with the cradle 46, the outer stator ring 32 remains, in general, relatively cool. Likewise, the airfoil portion 24 of the damaged stator vane 21 is cooled by the pliers 150. However, because the aperture 64 is located directly below the damaged stator vane 21, heat is not conducted away from the interface of the tip 28 of the damaged stator vane 21 and the outer stator ring 32 rapidly enough to prevent melting of the bonding material, and therefore there is a build up of heat in the outer stator ring 32 immediately adjacent the interface.

The current is maintained until substantially all of the bonding material at the interface of the damaged stator vane tip 28 and the outer stator ring 32 melts which, depending on the amperage selected, may take around five (5) minutes. Preferably, the optical pyrometer 52 is used to determine the temperature of the bonding material to ensure that the material has reached the melting temperature thereof. Once the bonding material has melted, the flow of electrical current through the bonding material at the interface is terminated, and immediately thereafter the shaft 80 of the hydraulic ram 74 is retracted, thereby pulling the damaged stator vane 21 away from the outer stator ring 32 until the stator vane tip 28 is in spaced relation to the outer stator ring 32.

As those skilled in the art will readily appreciate, the method and apparatus of the present invention significantly reduce the time and labor required to remove damaged stator vanes as compared to the method of the prior art. Unlike the EDM process of the prior art, the method of the present invention does not require a skilled technician to ensure that the hole about the vane tip 28 is cut properly. Additionally, test runs of the apparatus indicate that little or no grinding of the outer stator ring 32 about the hole is required after the damaged vane is removed, and the replacement vane can be brazed into place due to the minimal gap created at the interface of the replacement vane tip and the outer stator ring 32.

Although this invention has been shown and described with respect to a detailed embodiment thereof, it will be understood by those skilled in the art that various changes in form and detail thereof may be made without departing from the spirit and scope of the claimed invention.

We claim:

1. A method of separating a stator vane from a stator outer ring, said stator vane bonded to the stator ring by a bonding material at an interface between the stator vane and the stator ring, said method comprising:

providing a device for fixing the position of the stator ring relative to the stator vane;

heating the bonding material at the interface until substantially all of the bonding material at the interface melts; and, pulling the stator vane away from the stator ring until the stator vane is in spaced relation to the stator ring.

2. The method of claim 1 wherein the bonding material has a first melting temperature defining the temperature at which the bonding material melts, and the stator vane and the stator ring are made of material having a melting temperature greater than the bonding material melting temperature.

3. The method of claim 2 wherein the stator vane, stator ring and the bonding material are made of metal, the bonding material provides some resistance to the flow of electrical current therethrough, and the step of heating the bonding material includes flowing electrical current between the stator vane and the stator ring through the bonding material at the interface, said current flowing through said bonding material heating the bonding material due to the resistance provided by the bonding material, said current at an amperage sufficient to heat the bonding material to the melting temperature of the bonding material.

4. The method of claim 3 wherein the step of providing a device includes providing means for cooling the stator vane, and the step of heating the bonding material includes cooling the stator vane adjacent the interface to reduce the build up of heat in the stator vane.

5. The method of claim 4 wherein the step of providing a device includes providing means for pulling the stator vane away from the stator ring.

6. The method of claim 5 wherein the step of pulling the stator vane away from the stator ring is immediately preceded by the step of terminating the flow of electrical current through the bonding material at the interface.

7. The method of claim 3 wherein the step of providing a device includes providing means for cooling the stator ring, and the step of heating the bonding material includes cooling the stator ring adjacent the interface to reduce the build up of heat in the stator ring.

8. The method of claim 7 wherein the step of providing a device includes providing means for pulling the stator vane away from the stator ring.

9. The method of claim 8 wherein the step of pulling the stator vane away from the stator ring is immediately preceded by the step of terminating the flow of electrical current through the bonding material at the interface.

10. The method of claim 3 wherein the step of providing a device includes providing means for cooling the stator vane and the stator ring, and the step of heating the bonding material includes cooling the stator vane adjacent the interface to reduce the build up of heat in the stator vane and cooling the stator ring adjacent the interface to reduce the build up of heat in the stator ring.

11. The method of claim 10 wherein the step of providing a device includes providing means for pulling the stator vane away from the stator ring.

12. The method of claim 11 wherein the means for pulling the stator vane away from the stator ring includes a hydraulic ram.

13. The method of claim 11 wherein the step of pulling the stator vane away from the stator ring is immediately preceded by the step of terminating the flow of electrical current through the bonding material at the interface.

14. A device for separating a first component from a second component, said first component bonded to the second component by a bonding material at an interface between the first and second components, the components and the bonding material are made of metal, and the bonding material provides some resistance to the flow of electrical current therethrough, said device comprising a fixture for fixing the position of one of the components relative to the other component, said fixture removeably attached to the second component;

heating means for heating the bonding material at the interface, the heating means comprising an electrical power supply, and first and second electrical conductors connected to said power supply, the first electrical conductor connected to said fixture and the second electrical conductor connected to said means for pulling one of the components away from the other component;

cooling means for cooling at least one of the components; and pulling means for pulling one of the components away from the other component, said pulling means removeably attached to the first component, the pulling means comprising a vane pulling tool, a puller block and a hydraulic ram, the vane pulling tool is secured to the ram by the puller block, the second electrical conductor is connected to the puller block, and the first component is removeably fastened to the vane pulling tool.

15. The device of claim 14 wherein the cooling means includes at least one cooling tube containing a coolant, said cooling tube in thermal contact with at least one of the components.

16. The device of claim 15 wherein the cooling tube is in thermal contact with the first component.

17. The device of claim 15 wherein the cooling tube is in thermal contact with the second component.

18. The device of claim 1 wherein the means for cooling at least one of the components includes two cooling tubes, each tube contains coolant, one of said cooling tubes is in thermal contact with the first component, and the other cooling tube is in thermal contact with the second component.

19. The device of claim 18 wherein the first component is a stator vane of a gas turbine engine and the second component is a stator section of a gas turbine engine.

\* \* \* \* \*

UNITED STATES PATENT AND TRADEMARK OFFICE
CERTIFICATE OF CORRECTION

PATENT NO.  : 5,560,841
DATED       : October 1, 1996
INVENTOR(S) : Thomas DeMichael et al It is certified that error appears in the above-indentified patent and that said Letters Patent is hereby corrected as shown below:

In column 4 at line 5, change "tings" to --rings--.
In claim 18 at line 1, change "1" to --14--.

Signed and Sealed this

Thirteenth Day of May, 1997

Attest:

BRUCE LEHMAN

*Attesting Officer*    *Commissioner of Patents and Trademarks*